US008134924B2

(12) United States Patent
Li et al.

(10) Patent No.: US 8,134,924 B2
(45) Date of Patent: Mar. 13, 2012

(54) METHODS AND APPARATUS RELATED TO SCHEDULING IN A WIRELESS COMMUNICATIONS SYSTEM USING SHARED AIR LINK RESOURCES FOR TRAFFIC

(75) Inventors: Junyi Li, Bedminster, NJ (US); Rajiv Laroia, Far Hills, NJ (US); Thomas Richardson, South Orange, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 11/945,746

(22) Filed: Nov. 27, 2007

(65) Prior Publication Data

US 2009/0135720 A1   May 28, 2009

(51) Int. Cl.
G08C 15/00 (2006.01)
H04J 3/16 (2006.01)
H04L 12/56 (2006.01)
(52) U.S. Cl. ........................ 370/232; 370/235; 370/395.4
(58) Field of Classification Search ................. 370/229, 370/230, 230.1, 232, 235, 310–350, 395.3, 370/458
See application file for complete search history.

(56) References Cited

U.S. PATENT DOCUMENTS

| | | | |
|---|---|---|---|
| 6,219,343 B1 * | 4/2001 | Honkasalo et al. ............ 370/335 |
| 6,404,777 B1 * | 6/2002 | Hattori et al. .................. 370/468 |
| 6,810,426 B2 * | 10/2004 | Mysore et al. ................. 709/234 |
| 7,023,866 B2 * | 4/2006 | Giroux et al. .................. 370/412 |
| 7,304,978 B2 * | 12/2007 | Kuroda et al. ................. 370/347 |
| 2002/0089931 A1 * | 7/2002 | Takada et al. .................. 370/232 |
| 2005/0036475 A1 | 2/2005 | Nishiyama et al. |
| 2006/0045094 A1 * | 3/2006 | Yun et al. ..................... 370/395.4 |
| 2006/0126559 A1 * | 6/2006 | Jun et al. ........................ 370/329 |
| 2006/0285522 A1 * | 12/2006 | Kim et al. ...................... 370/331 |
| 2007/0038743 A1 | 2/2007 | Hellhake et al. |
| 2007/0053322 A1 * | 3/2007 | Park et al. ...................... 370/329 |
| 2007/0105574 A1 | 5/2007 | Gupta et al. |
| 2007/0140110 A1 * | 6/2007 | Kaler ............................. 370/218 |
| 2007/0174465 A1 * | 7/2007 | Huang et al. ................... 709/227 |
| 2008/0205275 A1 * | 8/2008 | Rinne et al. .................... 370/235 |
| 2009/0040928 A1 * | 2/2009 | Wang et al. .................... 370/232 |
| 2009/0122700 A1 * | 5/2009 | Aboba et al. ................... 370/230 |

OTHER PUBLICATIONS

International Search Report and Written Opinion—PCT/US2008/084589, International Search Authority—European Patent Office—Apr. 6, 2009.

* cited by examiner

*Primary Examiner* — Warner Wong
(74) *Attorney, Agent, or Firm* — James K. O'Hare

(57) ABSTRACT

Methods and apparatus related to scheduling decisions of a peer to peer communications device for transmission into traffic intervals are described. A first peer to peer communications device maintains a set of information which allows it to base a scheduling decision for a current traffic interval upon prior performance in a prior traffic interval in which users of other connections were also operating. In some embodiments, the set of information includes a list of device or connection identifiers which the first peer to peer communications device has previously determined to have corresponded to a prior traffic interval in which the first peer to peer device had a low determined data rate. In some embodiments, the set of information includes: (i) a list of device or connection identifiers corresponding to prior traffic intervals and (ii) first peer to peer device data rate information associated with the prior traffic intervals

25 Claims, 11 Drawing Sheets

METHODS AND APPARATUS RELATED TO SCHEDULING IN A WIRELESS COMMUNICATIONS SYSTEM USING SHARED AIR LINK RESOURCES FOR TRAFFIC

FIELD

Various embodiments are directed to methods and apparatus for use in a wireless communications system and, more particularly, for use in a peer to peer wireless communications system.

BACKGROUND

In a peer to peer wireless communications system multiple devices may desire to transmit traffic signals concurrently using the same air link resources. Scheduling users to an air link traffic resource in an efficient manner in a system lacking centralized control can be a challenging task. Accordingly, there is a need for efficient scheduling methods and apparatus.

It would be beneficial if methods and apparatus were developed which take in account interference implications of transmission scheduling decisions. A peer to peer wireless device could benefit, when making scheduling decisions, if a method and apparatus were developed which allowed it to be aware of the scheduling intentions of other peer to peer devices in the local vicinity.

In a decentralized wireless communications system in which a peer to peer device finds itself transmitting concurrently with different devices on a traffic air link resource from one interval to another, one would expect the achievable data rate for the peer to peer device may vary due to, for example, varying amounts of interference caused by other communications devices using a time slot concurrently with the device. It would be beneficial if methods and apparatus were developed which allowed a user to utilize prior concurrent user information and/or prior interval data rate information, when making a scheduling decision for a current interval.

SUMMARY

Methods and apparatus for use in a wireless communications system in which traffic air link resources may be, and sometimes are, shared are described. Various described methods and apparatus are well suited for use in a peer to peer communications system in which transmission control decisions are made in a decentralized manner.

An exemplary communications method in accordance with various embodiments comprises: monitoring to detect transmission requests corresponding to a current traffic interval and accessing stored information based on rate information obtained from a previous traffic interval, said stored information including information indicating a device or connection for which a transmission request corresponding to a previous traffic interval was detected. In various embodiments, the method further comprises deciding whether or not to transmit during the current traffic interval based on said stored information based on rate information for one or more previous traffic intervals. The exemplary method is performed in one embodiment, for example, by a first peer to peer wireless terminal which has an ongoing peer to peer connection with a second peer to peer wireless terminal. In such an embodiment, the first communications device considers the impact with regard to its own traffic signaling in view of transmission requests corresponding to other connections which are requesting to use the same current traffic interval air link resource.

In some but not necessarily all embodiments, the stored information includes a list of device identifiers or connection identifiers which correspond to devices and/or connections which have been identified as concurrently scheduling traffic signaling in a traffic interval which resulted in a determined data rate by the first device which is below a threshold. In some other embodiments, the stored information includes: (i) a list of device identifiers or connection identifiers which correspond to devices and/or connections which have been identified as having been associated with concurrently scheduling traffic signaling in one or more previous traffic intervals with the first device and (ii) data rate information for the first device corresponding to one or more previous traffic intervals.

Thus the first device makes an informed decision as to whether to proceed with traffic signaling for a current traffic interval or to yield and refrain from transmitting in the current traffic interval as a function of anticipated concurrent users based on detected transmission requests corresponding to other connections and stored information which links prior traffic interval low traffic data rates for the first device with particular concurrent users or connections.

An exemplary communications device, in accordance with some embodiments comprises: a monitoring module for monitoring to detect transmission requests corresponding to a current traffic interval; a memory for storing information based on rate information corresponding to a traffic interval. In some such embodiments, the exemplary communications device further comprises: a retrieval module for accessing stored information based on rate information obtained from a previous traffic interval, said stored information including information indicating a device or connection for which a transmission request corresponding to the previous traffic interval was detected, and a transmission decision module for deciding whether or not to transmit during the current traffic interval based on said stored rate information for the previous interval.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
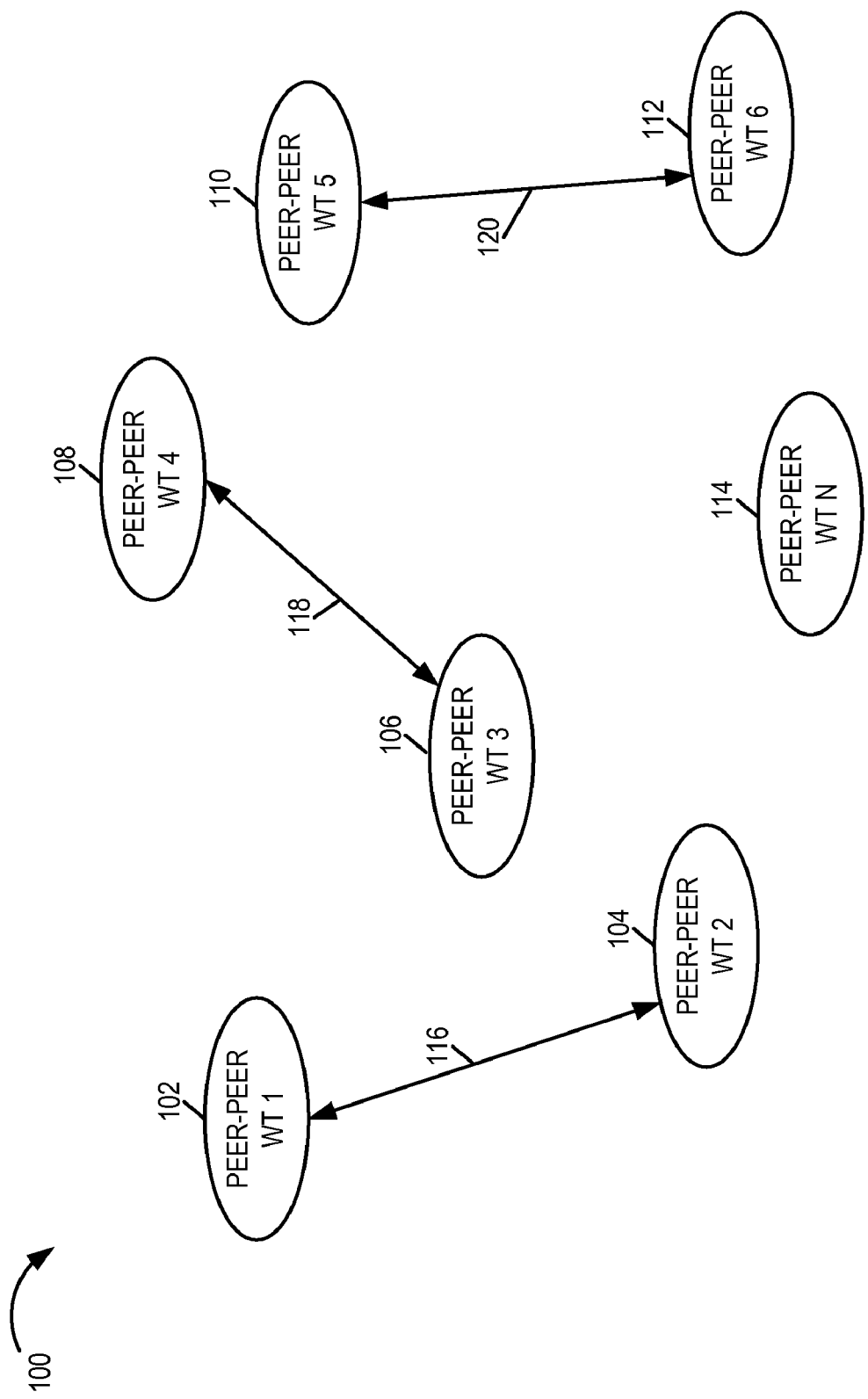
FIG. 1 is a drawing of an exemplary peer to peer wireless communications system in accordance with various embodiments.

FIG. 1 is a drawing of an exemplary peer to peer wireless communications system 100 in accordance with various embodiments. Exemplary wireless communications system 100 includes a plurality of wireless terminals, e.g., mobile nodes, supporting peer to peer communications (peer to peer wireless terminal 1 102, peer to peer wireless terminal 2 104, peer to peer wireless terminal 3 106, peer to peer wireless terminal 4 108, peer to peer wireless terminal 5 110, peer to peer wireless terminal 6 112, . . . , peer to peer wireless terminal N 114). In this example, at the time represented by FIG. 1, peer to peer wireless terminal 1 102 has an active connection with peer to peer wireless terminal 2 104 as indicated by arrow 116; peer to peer wireless terminal 3 106 has an active connection with peer to peer wireless terminal 4 108 as indicated by arrow 118; and peer to peer wireless terminal 5 110 has an active connection with peer to peer wireless terminal 6 112 as indicated by arrow 120.

In accordance with a feature of various embodiments, a decision whether or not to transmit on a peer to peer air link traffic resource, e.g., a peer to peer traffic segment, is performed in a distributed manner with both the transmission node and receiving node having an input into the decision process. In various embodiments, interference considerations regarding other peer to peer communications devices which may desire to transmit on the same peer to peer air link traffic resource are considered in making a transmission decision. In some such embodiments, monitored peer to peer signals from peer to peer devices with which a peer to peer device does not have an active connection are used in the transmission decision process. For example, a first peer to peer device which desires to transmit peer to peer traffic signals to a second peer to peer device, with which it has a current peer to peer connection, in a current traffic interval transmits a request to transmit signal and also monitors for transmission request signals corresponding to other connections which are requesting for using same traffic interval.

In accordance with a feature of various embodiments, a user scheduling interval includes a plurality of transmission request mini intervals, and a wireless terminal which transmits a request in one of the mini-transmission request interval monitors at least one of the other mini-request intervals for requests corresponding to different connections. In some embodiments, a wireless terminal accesses stored information, e.g., wireless terminal identifier information, connection identifier information, and/or rate information associated with previous traffic intervals and uses such information in conjunction with detected requests corresponding to other connections in making a determination as to whether or not to proceed in a current traffic interval.

Figure 2:
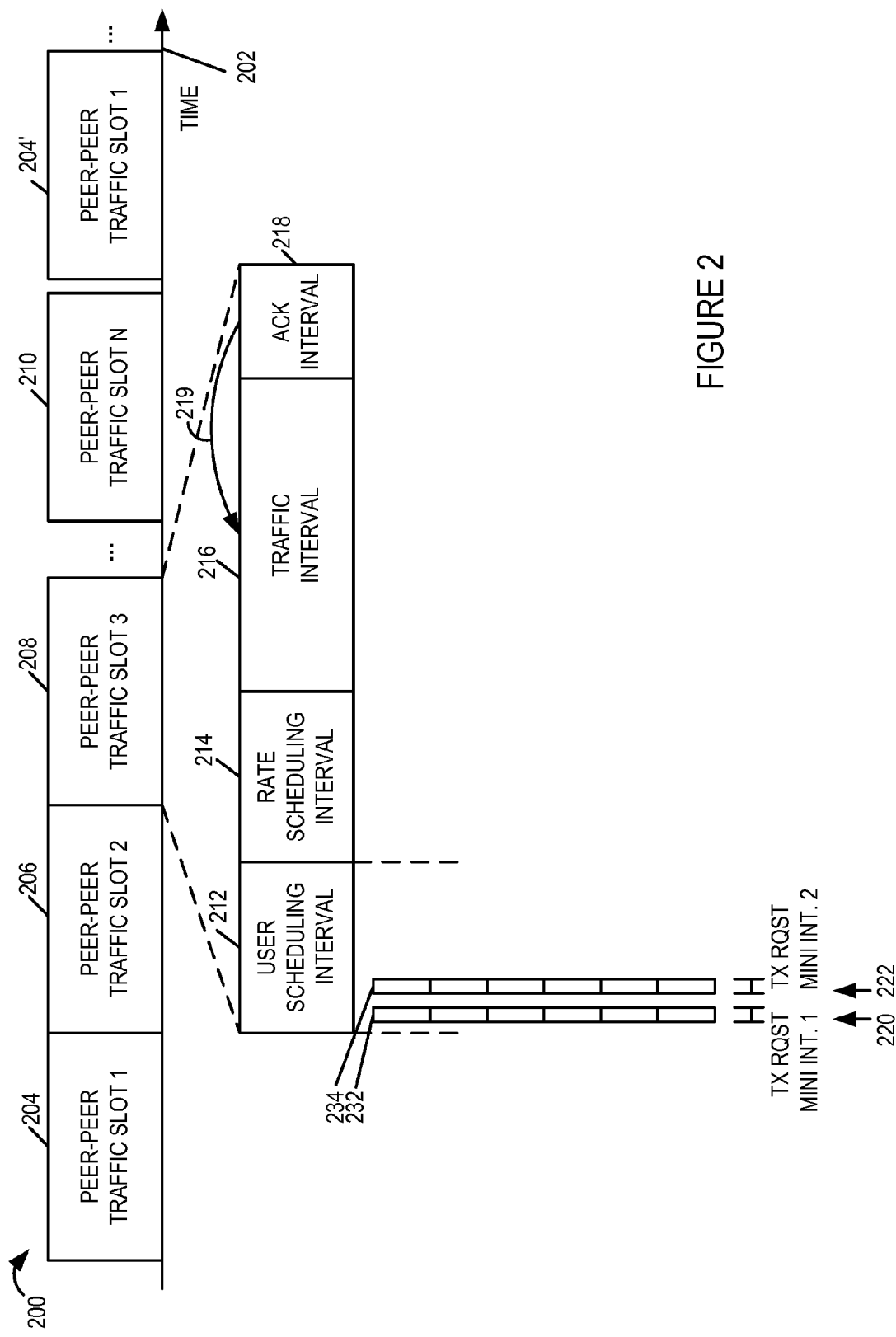
FIG. 2 is a drawing of exemplary peer to peer traffic slots in accordance with various embodiments.

FIG. 2 is a drawing 200 of exemplary peer to peer traffic slots in accordance with various embodiments. Drawing 200 illustrates an exemplary sequence of peer to peer traffic slots (peer to peer traffic slot 1 204, peer to peer traffic slot 2 206, peer to peer traffic slot 3 208, . . . , peer to peer traffic slot N 210) along time axis 202. In this exemplary embodiment, the sequence repeats as part of a recurring timing structure as indicated by peer to peer traffic slot 1 204' following peer to peer traffic slot N 210.

The exemplary drawing 200 is, e.g., a logical representation. In some embodiments, logical structure communications resources are mapped to physical air link resources. For example, peer-to-peer traffic slot 3 208 is shown to include user scheduling interval 212, rate scheduling interval 214, traffic interval 216, and acknowledgment interval 218, and those portions are adjacent to each other. The physical air link resources associated with those portions may have time gaps between them, e.g., to allow processing time. In some embodiments, tone hopping is implemented as part of the mapping.

Each exemplary peer to peer traffic slot, in some embodiments, includes a user scheduling interval, a rate scheduling interval, a traffic interval and an acknowledgement interval. In one exemplary embodiment, an exemplary peer to peer traffic slot, e.g., peer to peer traffic slot 3 208 includes user scheduling interval 212, rate scheduling interval 214, traffic interval 216 and acknowledgement interval 218. Acknowledgement interval 218 corresponds to traffic interval 216 as indicated by arrow 219.

The user scheduling interval 212 includes a plurality of transmission request mini intervals (transmission request mini interval 1 220, transmission request mini interval 2 222). During the user scheduling interval 212 at least some symbols are designated for conveying traffic transmission request signals, e.g., a TX request signal. Exemplary symbol 232, is designated to be conveyed during TX request mini-interval 1 220. Exemplary symbol 234, is designated to be conveyed during TX request mini-interval 2 222. In some embodiments, a transmission request signal corresponding to a connection utilizes one tone for one symbol transmission time mini-interval.

Figure 3:
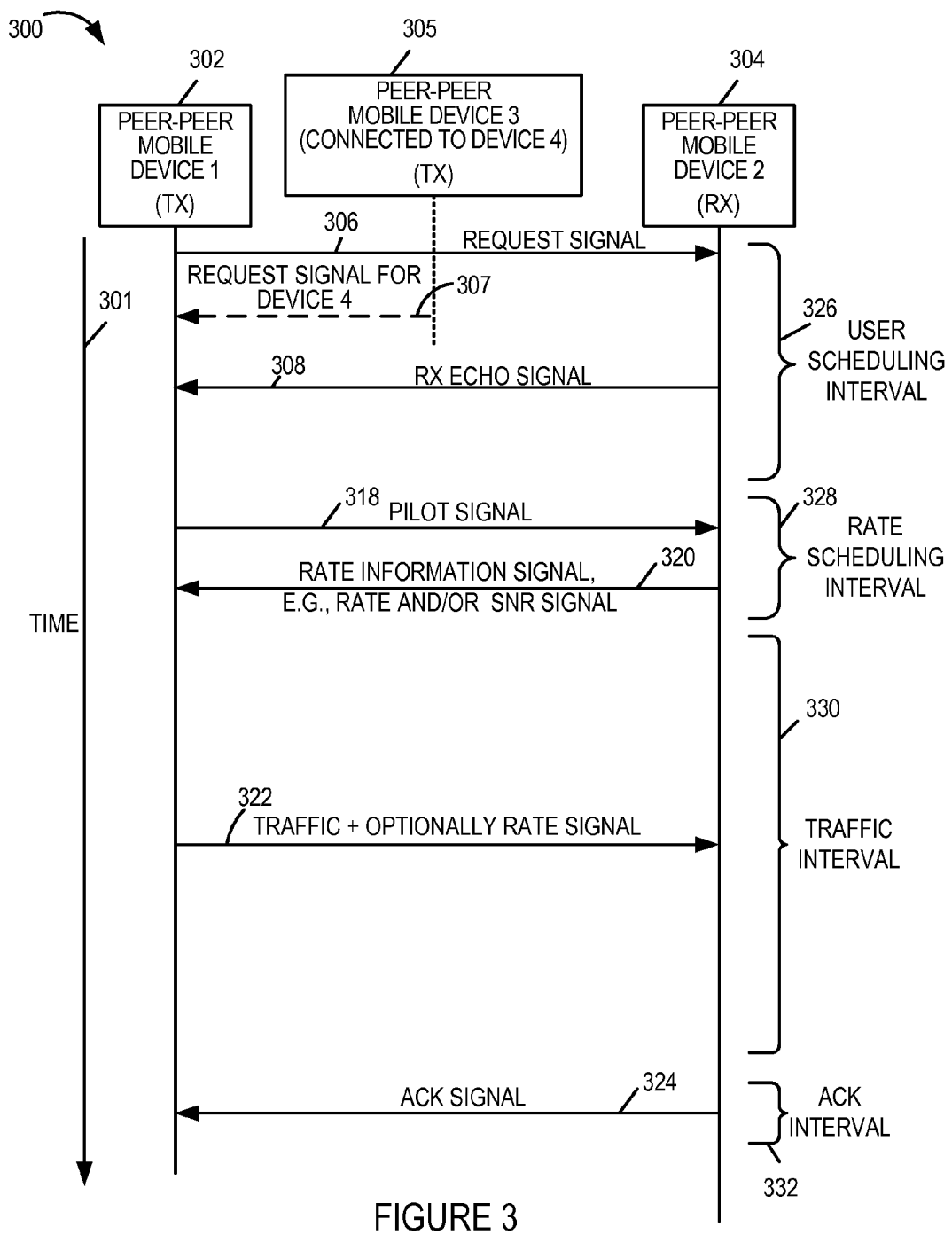
FIG. 3 is a drawing illustrating peer to peer mobile communications devices and exemplary signaling exchanged between the devices to support peer to peer traffic in accordance with various embodiments.

FIG. 3 is a drawing 300 illustrating peer to peer mobile communications devices (302, 304) and exemplary signaling exchanged between the devices (302, 304) to support peer to peer traffic in accordance with various embodiments, e.g., under the situation where the first device wants to send traffic in the slot to the second device and is allowed to proceed in accordance with priority considerations and interference considerations. Additional signals from other peer to peer devices in the local vicinity may be, and sometimes are, considered and utilized. For example, FIG. 3 also includes exemplary peer to peer mobile communications device 3 305 which has a current peer to peer connection with device 4. The communications devices (302, 304, 305) may be any of the peer to peer wireless terminals of FIG. 1. In this example, peer to peer mobile device 1 302 desires to transmit traffic signals to peer to peer mobile device 2 304. Line 301 indicates time; and there is a user scheduling interval 326, followed by a rate scheduling interval 328, followed by a traffic interval 330, followed by an acknowledgment interval 332. Intervals (326, 328, 330, 332) of FIG. 3 are, e.g., intervals (212, 214, 216, 218) of FIG. 2.

During the user scheduling interval 326, peer to peer mobile device 1 302 generates and transmits transmission request signal 306. Peer to peer mobile device 2 304, the intended recipient of transmission request signal 306 receives transmission request signal 306, processes the signal, considers the request. Peer to peer mobile device 1 302 also monitors for and detects request signal 307 transmitted from device 3 305 intended for device 4. Peer to peer mobile device 2 304 sends transmission request response signal, otherwise known as RX echo signal 308, if it approves of the request. If it does not approve the request, the peer to peer mobile device 2 304 does not send a response. Device 1 302 receives request response signals, and determines whether or not to continue as a function of whether or not it received request response signal 308. In determining whether or not to proceed, peer to peer mobile device 1 302 also accesses stored information associated with previous traffic slots in which a traffic data rate for device 1 302 was determined and a request corresponding to a connection which was not its own was detected, and makes the determination as to whether or not to proceed as a function of such accessed information and information identifying other connection request signals received which correspond to the current traffic slot. Thus peer to peer mobile device 302 can, and sometimes does, decide not to continue in the current traffic interval if it recognizes that the same device or connection which is requesting to transmit traffic signals in the current traffic interval, e.g., device 3 305 requesting to transmit to device 4, had requested to transmit in a prior traffic interval, and the determined data rate for device 1 302 for that prior traffic interval was a low data rate for mobile device 1 302 in that prior traffic interval, e.g., a rate below a predetermined threshold. The predetermined threshold can be an absolute threshold, e.g., expressed in terms of bits per second. The predetermined threshold can also be a relative threshold. For example, mobile device 1 302 may determine an average data rate for mobile device 1 302 to mobile device 2 304 from the previous traffic intervals. The average data rate can be estimated in a conventional method, e.g., using a moving window or an exponential weighting. The determined data rate for device 1 302 is considered to be relatively low during that prior traffic interval in which device 3 305 also requested to transmit to device 4, if the determined data rate was below a fraction of the average data rate. The fraction, i.e., the relative threshold, can be 80%, 50% or 30%, of the average data rate. The same type of threshold as described above with respect to the alternatives described with respect to FIG. 3, may be, but need not in all cases be, a threshold used in of any the methods described with respect to FIGS. 5, 6, and 7 and/or the communications devices of FIGS. 8 and 9 or the examples of FIGS. 10 and 11. Other possible definitions for the threshold are also possible and may be used in various embodiments.

In some embodiments as shown in FIG. 3, mobile device 1 302 first transmits request signal 306 to mobile device 2 304 and subsequently detects the request signal from mobile device 3 305 for device 4, and then decides not to proceed. In another embodiment, which is an alternative to what is shown in FIG. 3, mobile device 1 302 first detects the request signal from mobile device 3 305 for device 4 before it transmits request signal to mobile device 2 304. When mobile device 1 decides not to proceed, it may not transmit request signal.

In this example, we will assume that the device 3 request signal 307 detected by device 1 302 did not correspond to a previous traffic interval for which device 1 302 had a determined low data rate. Therefore, in such a situation, device 1 302 continues on to the rate scheduling portion. During rate scheduling interval 328, the peer to peer mobile communications device 1 302 sends pilot signal 318. Peer to peer mobile device 2 304 receives the pilot signal 318, measures the received signal strength, and generates a rate information signal 320. The rate information signal 320 communicates, e.g., a rate, a signal to noise ratio (SNR) value, an interference value, and/or a signal to interference ratio (SIR) value, so that peer to peer mobile device 1 302 can determine a maximum allowable data rate to be used during subsequent traffic interval 330. Peer to peer mobile device 2 304 transmits the generated rate information signal 320 to peer to peer mobile device 1 302.

Peer to peer mobile device 1 302 receives the rate information signal 320 and determines a maximum allowed transmission rate to be used for traffic portion 330. Peer to peer mobile device 1 302 determines an actual data rate to use as a function of the determined maximum allowed transmission rate, wherein the actual data rate is less than or equal to the maximum allowed transmission rate. In various embodiments, the peer to peer mobile device 1 302 also considers (i) the amount of traffic data waiting to be communicated and/or (ii) its power status, e.g., remaining battery power and/or mode of operation, in determining the actual transmission data rate to use for the traffic.

In some embodiments, peer to peer mobile device 1 302 updates stored device or connection identifier information corresponding to other connections as a function of determined rate information for device 1 302. For example, device 1 302 updates, e.g., adds to, a list of blacklisted device or connections, if a determined rate is below a threshold.

In some other embodiments, peer to peer mobile device 1 302 updates: (i) stored device or connection identifier information corresponding to other connections and (ii) corresponding determined rate information for device 1 302. Such information can be, and sometimes is, used in a subsequent traffic slot to make a decision as to whether or not to proceed.

Peer to peer mobile device 1 302 generates and transmits traffic signals 322 during traffic interval 330. The traffic signals communicate data at the determined actual data rate. In some embodiments, the traffic signals also carry an indication of the actual data rate. In one such embodiment, the rate information is communicated using a subset of the resources allocated for the traffic, e.g., the traffic resource includes a first portion, e.g., a first set of OFDM tone symbols, allocated to carry rate information, and a second portion, e.g., a second set of OFDM tone symbols, allocated to carry the traffic, e.g., user data, wherein the first and second sets are non-overlapping. In another such embodiment, the rate information is communicated using the same resources carrying traffic, e.g., the rate information is communicated via varying the transmit power of modulation symbols carrying traffic signals, e.g., some OFDM tone-symbols carrying the traffic are scaled at a first power level and others are scaled at a second power level, and the rate information is communicated by which positions are scaled at which levels.

Peer to peer mobile device 2 304 receives traffic signals 322 during traffic interval 330 and recovers the data being communicated. In some embodiments, rate information is also communicated with the traffic data. In some such embodiments, peer to peer mobile device 2 304 recovers the communicated rate information being communicated, and then decodes the traffic data signals. The peer to peer mobile device 2 304 determines whether or not the communicated data of the traffic signals 322 has been successfully recovered and generates a positive or negative acknowledgement signal.

During acknowledgment interval 332, the peer to peer mobile device 2 304 transmits the generated ACK signal 324 to mobile peer to peer device 1 302. Peer to peer mobile device 1 302 receives the ACK signal 324, and updates transmission queue information based on the information conveyed by ACK signal 324.

The process is repeated for additional traffic slots, e.g., as a function of traffic transmission needs of peer to peer mobile device 1 302. Stored information, which is a function of determined rate information, from a prior slot or slots is used in a current slot.

Figure 4:
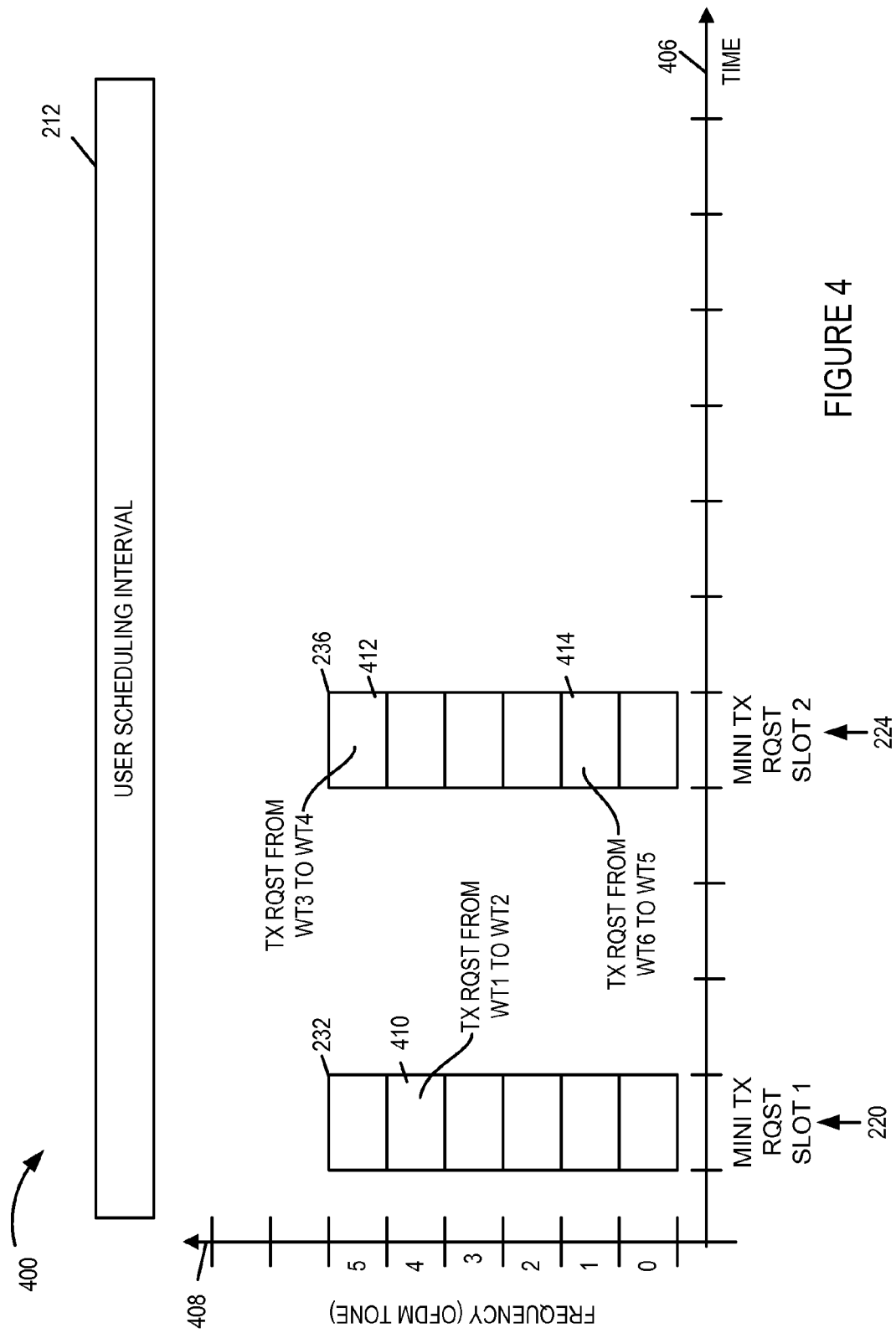
FIG. 4 is a drawing illustrating an exemplary user scheduling interval in a peer to peer recurring timing structure and includes exemplary air link resources of the user scheduling portion.

FIG. 4 is a drawing 400 illustrating an exemplary user scheduling interval 212 in a peer to peer recurring timing structure and includes exemplary air link resources of the user scheduling portion. The exemplary user scheduling interval 212 includes: (i) transmission mini TX request slot 1 220 and (ii) transmission mini TX request slot 2 224. Intervals (220, 224) are designated to carry transmission request signals (TX request signals).

Horizontal axis 406 represents time, while vertical axis 408 represents frequency, e.g., OFDM tones. OFDM symbol 232 carries transmission request signals for requests for connections mapped into a position in the first transmission request mini interval 220. OFDM symbol 236 carries transmission request signals for requests for connections mapped into a position in the second transmission request mini-interval 224.

In this example, the position designated to carry a transmission request from WT 1 to WT 2 for transmission in traffic interval 216 of peer to peer traffic signals from wireless terminal 1 to wireless terminal 2 is designated as OFDM tone-symbol 410 of OFDM symbol 232, which corresponds to tone with index number=4 in mini transmission request slot 1 220. In this example, the position designated to carry a transmission request from WT 3 to WT 4 for transmission in traffic interval 216 of peer to peer traffic signals from wireless terminal 3 to wireless terminal 4 is designated as OFDM tone-symbol 412 of OFDM symbol 236, which corresponds to tone with index number=5 in mini transmission request slot 2 224. In this example, the position designated to carry a transmission request from WT 6 to WT 5 for transmission in traffic interval 216 of peer to peer traffic signals from wireless terminal 6 to wireless terminal 5 is designated as OFDM tone-symbol 414 of OFDM symbol 236, which corresponds to tone with index number=1 in mini transmission request slot 2 224.

Figure 5:
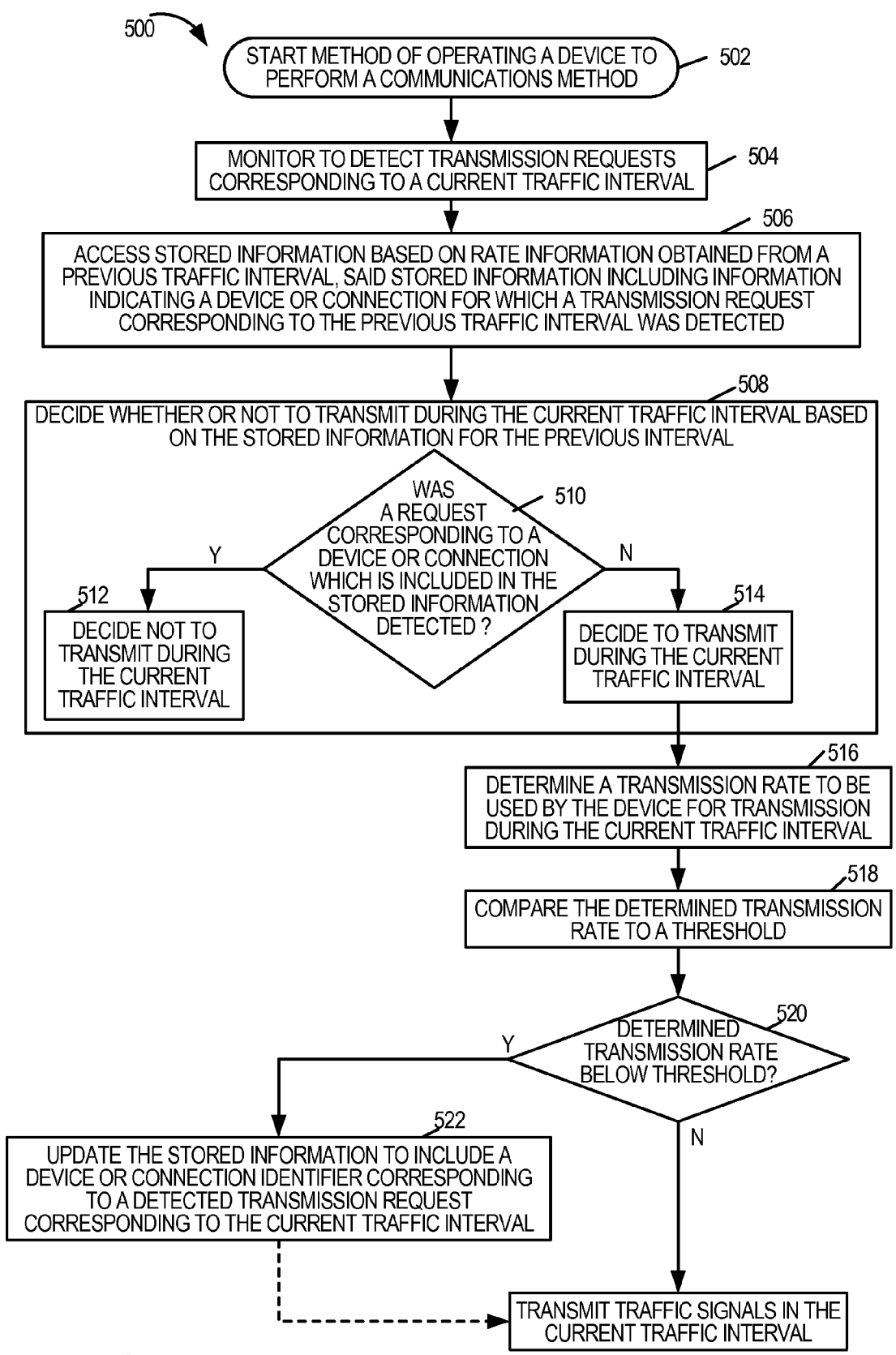
FIG. 5 is a flowchart of an exemplary method of operating a communications device, e.g., a wireless communications device supporting peer to peer communications, in accordance with various embodiments.

FIG. 5 is a flowchart 500 of an exemplary method of operating a communications device, e.g., a wireless communications device supporting peer to peer communications, in accordance with various embodiments. Operation of the exemplary method starts in step 502 and proceeds to step 504.

In step 504, the communications device monitors to detect transmission requests corresponding to a current traffic interval. Operation proceeds from step 504 to step 506. In step 506, the communications device accesses stored information based on rate information from a previous traffic interval, said stored information including information indicating a device or connection for which a transmission request corresponding to the previous traffic interval was detected. In various embodiments, the stored information includes a list of devices or connections with which a data rate for the communications device below a threshold was determined for a previous interval. For example, the stored information includes a list of "blacklisted" devices or a list of "blacklisted" connections. Operation proceeds from step 506 to step 508.

In step 508 the communications device decides whether or not to transmit during the current traffic interval based on the stored information for the previous traffic interval. In some embodiments, deciding whether or not to transmit during the current traffic interval is based on a device or connection identifier corresponding to a detected transmission request corresponding to the current traffic interval. Step 508 includes sub-steps 510, 512 and 514. In sub-step 510 the communications device determines if a request corresponding to a device or connection which is included in the stored information was detected. If such a request was detected in the monitoring of step 504, then operation proceeds from sub-step 510 to sub-step 512; otherwise operation proceeds from sub-step 510 to sub-step 514. In sub-step 512, the communications device decides not to transmit during the current traffic interval. In sub-step 514 the communications device decides to transmit during the current traffic interval. Operation proceeds from sub-step 514 to step 516.

In step 516, the device determines a transmission rate to be used by the device for transmission during the current traffic interval. Operation proceeds from step 516 to step 518. In step 518 the communications device compares the determined transmission rate of step 516 to a threshold. In some embodiments, the threshold is predetermined and does not change over time. In some embodiments, the threshold may, and sometimes does, change between different intervals, e.g., with a threshold being used for the current interval being different than a threshold used in a previous interval. For example, the threshold may change as a function of device priority, a received priority signal from another device, latency information, or backlog information. Operation proceeds from step 518 to decision step 520.

In step 520 if the determined transmission rate is below the threshold, then operation proceeds to step 522. However, if the determined transmission rate is not below the threshold, then operation proceeds from step 520 to step 524, in which the device transmits traffic signals in the current traffic interval, e.g., peer to peer traffic signals.

Returning to step 522, in step 522 the communications device updates the stored information to include a device identifier or connection identifier corresponding to a detected transmission request corresponding to the current traffic interval. For example, in step 522 the communications device updates a list of "blacklisted" devices or a list of "blacklisted" connections. This "blacklist" of devices or connections is available for use in subsequent traffic intervals to provide a warning to the device that concurrent operation with such a "blacklisted" device or connection may result in a low determined data rate for the device during a traffic interval. In some embodiments, operation proceeds from step 522 to step 524, in which the device transmits traffic signals in the current traffic interval, even though the transmission data rate may be low. However, in some other embodiments, operation does not proceed from step 522 to step 524 since the determined transmission rate to be used for the device is below the threshold.

In some embodiments, a decision is made as to whether or not to proceed from step 522 to step 524 as a function of a comparison of the determined transmission rate to a threshold which is different than the threshold used in the comparison of step 518. For example, threshold A is used to decide upon updating a list of devices or connection identifiers associated with a low determined data rate for the device, and threshold B is used for deciding upon whether or not to transmit traffic signals in the current traffic interval, wherein threshold A and threshold B are different values. In some embodiments, one or more of threshold A and threshold B are fixed predetermined values. In some embodiments, one or more of thresholds A and thresholds B can, and sometimes do, vary as a function of one or more of device priority, user priority, session priority, backlog information, latency information, and service level information.

Figure 6:
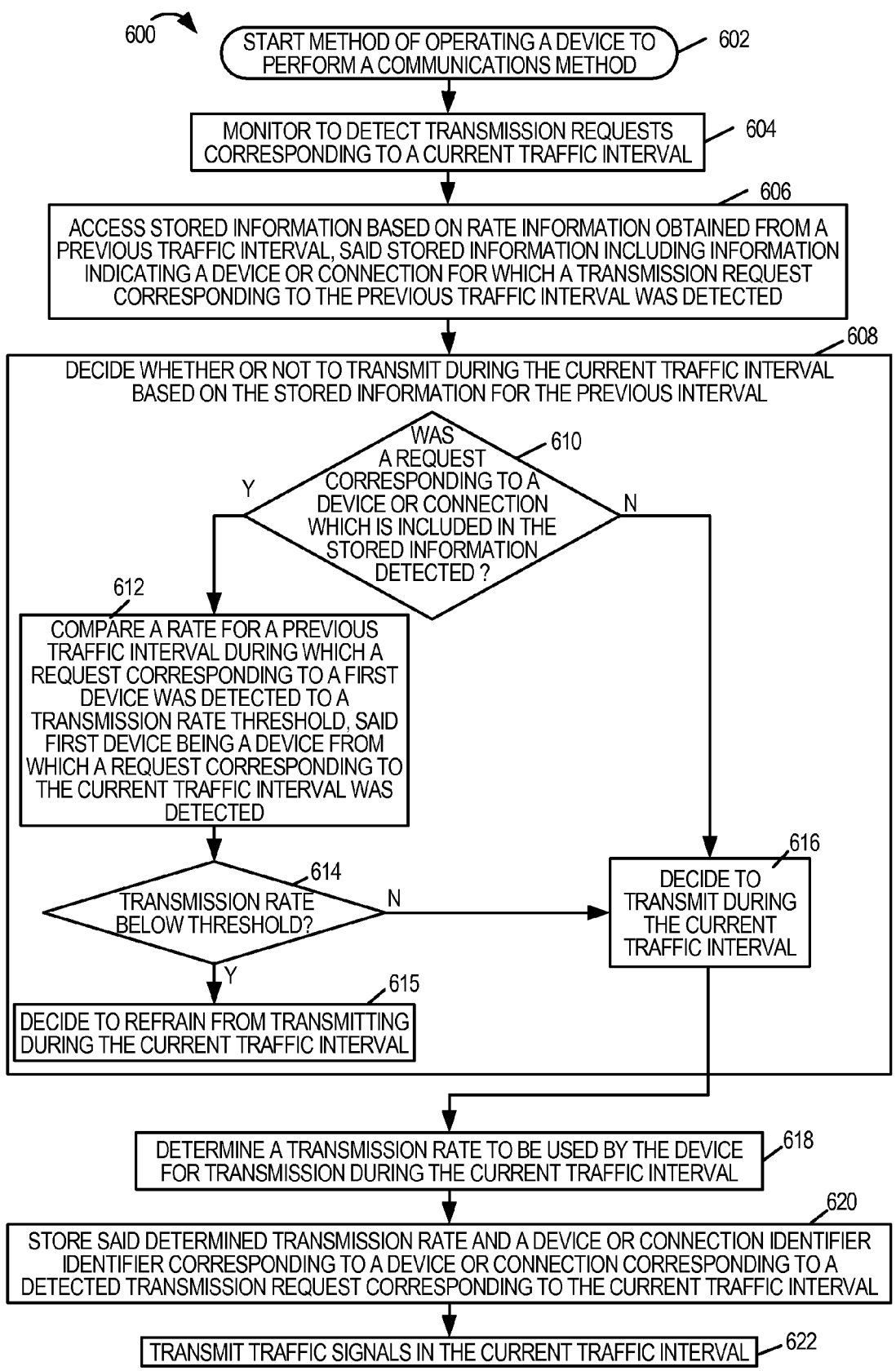
FIG. 6 is a flowchart of an exemplary method of operating a communications device, e.g., a wireless communications device supporting peer to peer communications, in accordance with various embodiments.

FIG. 6 is a flowchart 600 of an exemplary method of operating a communications device, e.g., a wireless communications device supporting peer to peer communications, in accordance with various embodiments. Operation of the exemplary method starts in step 602 and proceeds to step 604. In step 604, the communications device monitors to detect transmission requests corresponding to a current traffic interval. Then, in step 606 the communications device accesses stored information based on rate information obtained from a previous traffic interval, said stored information including information indicating a device or connection for which a transmission request corresponding to the previous traffic interval was detected. In various embodiments, the stored information includes rate information corresponding to a previous traffic interval and information identifying a device or connection corresponding to a detected transmission request corresponding to the previous traffic interval. Operation proceeds from step 606 to step 608.

In step 608, the communications device decides whether or not to transmit during the current traffic interval based on the stored information for the previous interval. Step 608 includes sub-steps 610, 612, 614, and 616. In sub-step 610, the communications device determines if a request corresponding to a device or connection which is included in the stored information was detected in the monitoring of step 604. If such a request was detected, then operation proceeds from sub-step 610 to sub-step 612. However, if such a request was not detected during the monitoring of step 604, then operation proceeds to sub-step 616.

Returning to sub-step 612, in sub-step 612 the communications device compares a rate for a previous traffic interval during which a request corresponding to a first device was detected to a transmission rate threshold, said first device being a device from which a request corresponding to the current traffic interval was detected. Operation proceeds from sub-step 612 to sub-step 614.

In sub-step 614, the communications device checks if the comparison of the transmission rate of the communications device for the previous interval during which a request corresponding to the first device was detected indicates that the transmission rate is below a threshold. If the comparison of sub-step 612 indicates that the rate is below the threshold, then operation proceeds from sub-step 614 to sub-step 615, where the communications device decides to refrain from transmitting in the current traffic interval. However, if the comparison of sub-step 612 indicates that the rate is not below the threshold, then operation proceeds from sub-step 614 to sub-step 616, where the communications device decides to transmit during the current traffic interval. Operation proceeds from sub-step 616 to step 618.

In step 618, the communications device determines a transmission rate to be used for transmission during the current traffic interval. Then, in step 620, the communications device stores the determined transmission rate of step 618 and a device or connection identifier corresponding to a device or connection corresponding to a detected transmission request corresponding to the current traffic interval.

Operation proceeds from step 620 to step 622. In step 622 the device transmits traffic signals in the current traffic interval, e.g., peer to peer traffic signals.

Figure 7:
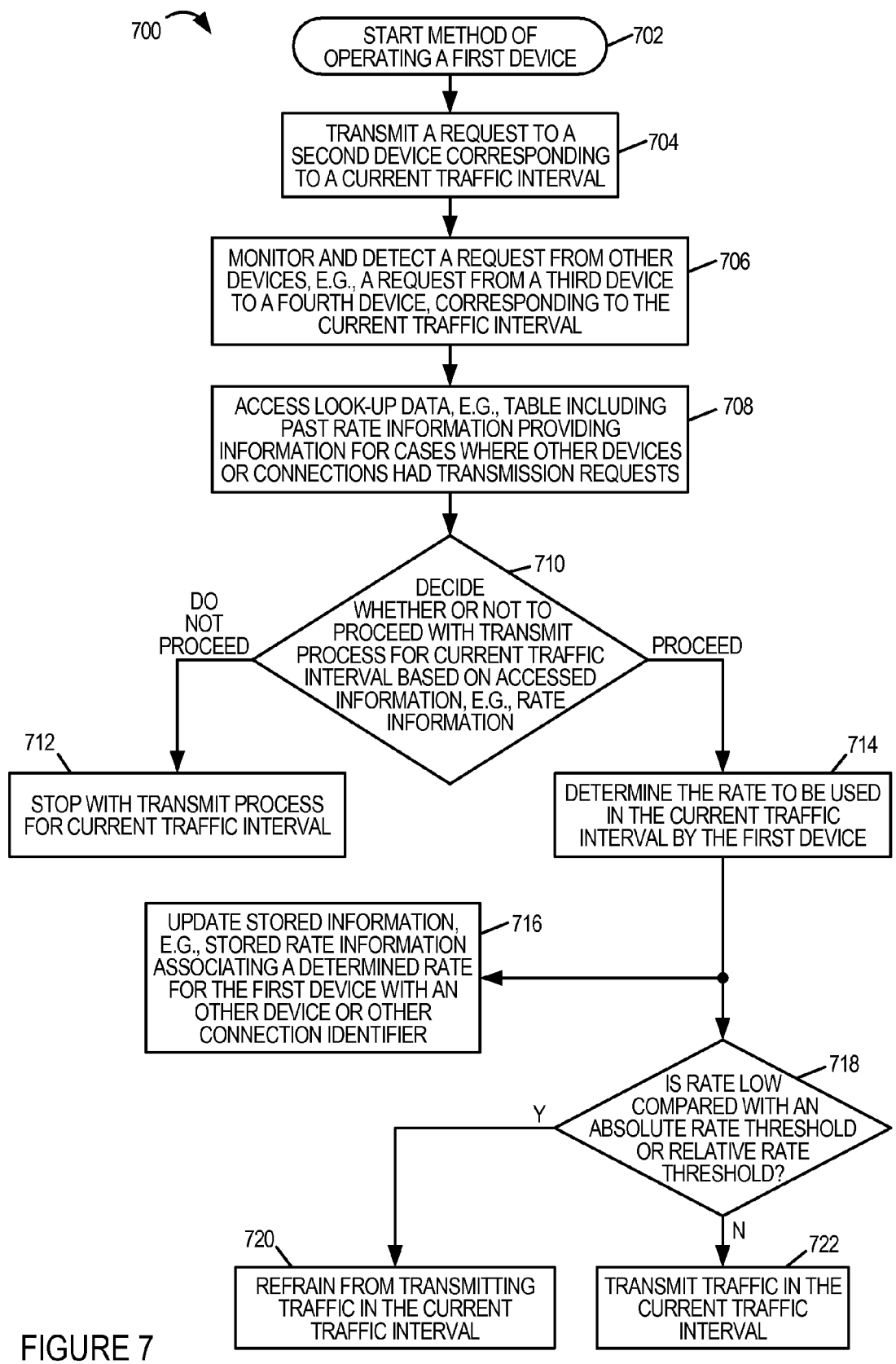
FIG. 7 is a flowchart of an exemplary method of operating a first device, e.g., a peer to peer wireless communications device, in accordance with various embodiments.

FIG. 7 is a flowchart 700 of an exemplary method of operating a first device in accordance with various embodiments. The first device is, e.g., a wireless communications device such as a mobile node supporting peer to peer communications with other devices, e.g., with a second device with which the first device has a current peer to peer wireless connection.

Operation proceeds from start step 702 to step 704. In step 704 the first device transmits a request to a second device corresponding to a current traffic interval. Then, in step 706, the first device monitors and detects a request from other devices, e.g., a request from a third device to a fourth device, corresponding to the same current traffic interval. Operation proceeds from step 706 to step 708.

In step 708 the first device accesses look-up data, e.g., a look-up table including past rate information providing information for cases where other device or connections has transmission requests corresponding to prior traffic intervals. Then, in step 710 the first device decides whether or not to proceed with the transmit process in the current traffic interval based on the accessed information, e.g., the accessed rate information. If the decision of step 710 is not to proceed with the transmit process, then operation proceeds from step 710 to step 712, where the first device stops with the transmit process for the current traffic interval. However, if the decision of step 714 is to proceed with the transmit process for the current traffic interval, then operation proceeds from step 710 to step 714.

In step 714, the first device determines the rate to be used in the current traffic interval by the first device for the transmission of traffic signals to the second device. In some embodiments, step 714 includes sending a peer to peer pilot signal directed to the second device during a rate scheduling interval and receiving a rate information signal in response to the transmitted pilot from the second device during the rate scheduling interval. Operation proceeds from step 714 to step 716 and step 718.

In step 716, the first device updates stored information, e.g., stored rate information, associating a determined rate for the first device with an other device identifier or an other connection identifier. The other device or other connection is the detected device or connection of the detected request of step 706. In step 718, the first device determines whether the determined rate of step 714 is low compared with an absolute rate threshold or a relative rate threshold. If the determined rate is determined to be low, then operation proceeds from step 718 to step 720, where the first device is controlled to refrain form transmitting traffic in the current traffic interval. However, if the determined rate is not low, then operation proceeds from step 718 to step 722, in which the first device transmits traffic in the current traffic interval.

Figure 8:
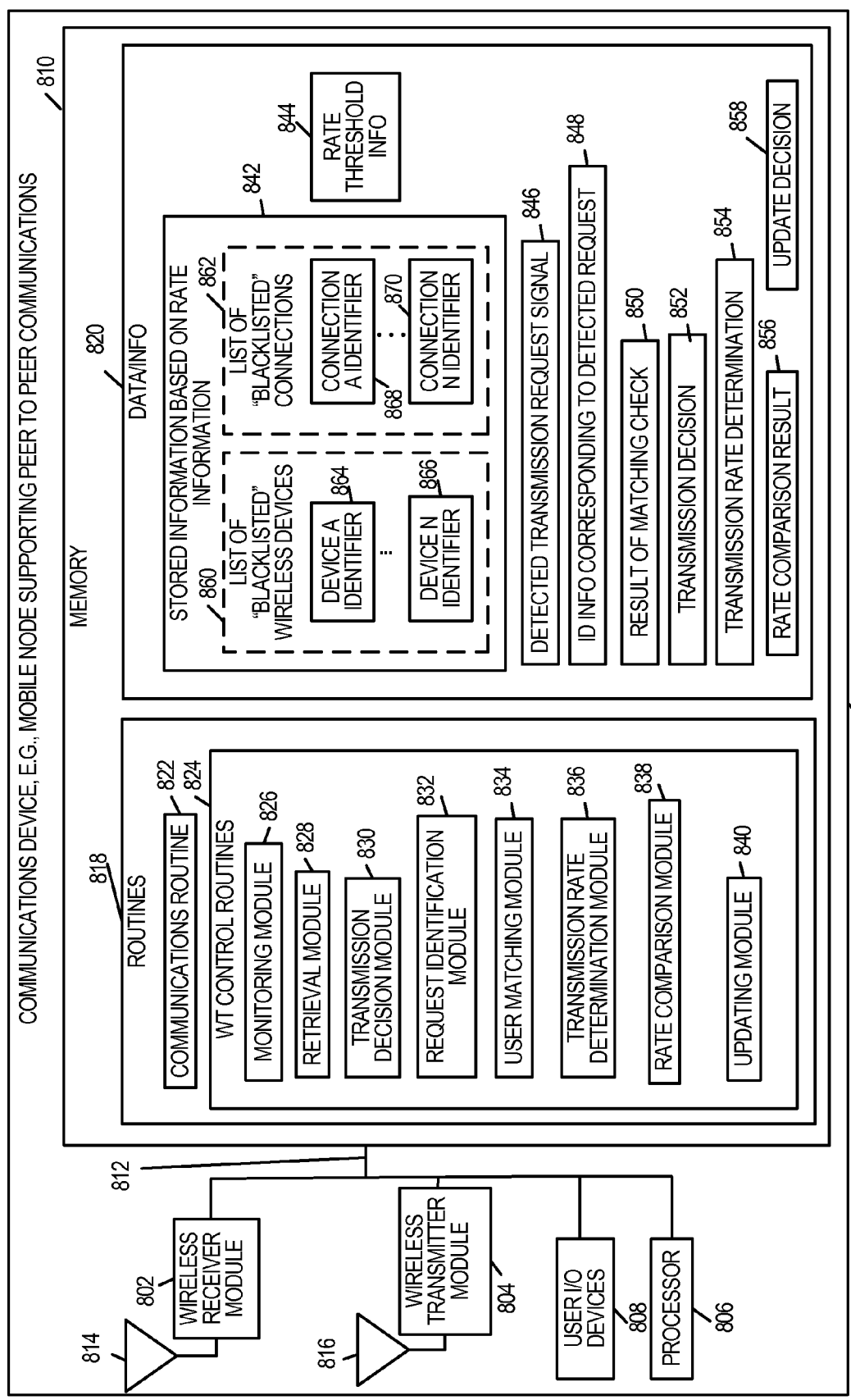
FIG. 8 is a drawing of an exemplary communications device, e.g., a mobile node supporting peer to peer communications in accordance with various embodiments.

FIG. 8 is a drawing of an exemplary communications device 800, e.g., a mobile node supporting peer to peer communications in accordance with various embodiments. Exemplary communications device 800 includes a wireless receiver module 802, a wireless transmitter module 804, a processor 806, user I/O devices 808, and memory 810 coupled together via a bus 812 over which the various elements exchange data and information.

Wireless receiver module 802, e.g., an OFDM receiver, is coupled to receive antenna 814 via which the communications device 800 receives signals from other communications devices. For example, communications device 800 receives transmission request response signals, rate information signals, and traffic channel acknowledgment signals from a peer to peer communications device with which the communications device 800 has a connection. Wireless receiver module 802 also receives transmission request signals from other peer to peer communications devices with which communications device 800 does not have a current connection.

Wireless transmitter module 804, e.g., an OFDM transmitter, is coupled to transmit antenna 816 via which the communications device 800 transmits signals. Transmitted signals include transmission request signals, peer to peer pilot signals, and traffic signals to a peer to peer device with which communications device 800 has a connection. In some embodiments, the same antenna is used for both transmitter and receiver.

User I/O devices 808 include, e.g., a microphone, a keyboard, a keypad, mouse, camera, switches, speaker, display, etc. User I/O devices 808 allow a user of communications device 800 to input data/information, access output data/information, and control at least some functions of the communications device 800.

Memory 810 includes routines 818 and data/information 820. The processor 806, e.g., a CPU, executes the routines 818 and uses the data/information 820 in memory 810 to control the operation of the communications device 800 and implement methods, e.g., the method of flowchart 500 of FIG. 5 or the method of flowchart 700 of FIG. 7.

Routines 818 include a communications routine 822 and wireless terminal control routines 824. The communications routine 822 implements the various communications protocols used by the communications device 800. The wireless terminal control routines 824 include a monitoring module 826, a retrieval module 828, a transmission decision module 830, a request identification module 832, a user matching module 834, a transmission rate determination module 836, a rate comparison module 838, and an updating module 840.

Data/information 820 includes stored information based on rate information 842, rate threshold information 844, a detected transmission request signal 846, identification information corresponding to the detected request 848, a result of a matching check 850, a transmission decision 852, a transmission rate determination 854, a rate comparison result 856, and an update decision 858. In one exemplary embodiment, stored information based on rate information 842 includes a list of "blacklisted" wireless devices, while in another exemplary embodiment information 842 includes a list of "blacklisted" connections 862. List of "blacklisted" wireless devices 860 includes a plurality of device identifiers (device A identifier 864, . . . , device N identifier 866). List of "blacklisted" connections 862 includes a plurality of connection identifiers (connection A identifier 868, . . . , connection N identifier 870).

Monitoring module 826 monitors to detect transmission requests corresponding to a traffic interval, e.g., a transmission request from a peer to peer device requesting another peer to peer device with which it has a connection to transmit traffic signals into a corresponding traffic interval which is the current traffic interval. Monitoring module 826 monitors to detect transmission requests intended for communications device 800 from another communications device with which communications device has a peer to peer connection. Monitoring module 826 also monitors to detect transmission requests, which are requests directed to other communications devices, e.g., a request communicated between a pair of connected communications devices which does not include communications device 800.

Retrieval module 828 accesses stored information based on rate information indicating a device or connection for which a transmission request corresponding to a previous traffic interval was detected. For example, consider an exemplary embodiment in which device 800 stores and maintains a list of "blacklisted" wireless devices 860, the retrieval module 828, retrieves a list of "blacklisted" identifiers corresponding to previous traffic intervals identifying wireless devices which had transmitted traffic requests during traffic intervals in which communications device 800 was determined to have a low data rate. Alternatively, consider an exemplary embodiment in which device 800 stores and maintains a list of "blacklisted" connection identifiers 862, the retrieval module 828, retrieves a list of "blacklisted" identifiers corresponding to previous traffic intervals identifying peer to peer connections for which traffic requests were communicated for previous traffic intervals in which communications device 800 was determined to have a low data rate.

Transmission decision module 830 decides whether or not device 800 should transmit during a current traffic interval based on stored information for one or more previous intervals. Transmission decision 852 is an output of decision module 830. In various embodiments, the transmission decision module 830 decides not to transmit during a current traffic interval when the user matching module 834 determines that there is a match.

Request identification module 832 associates a detected transmission request with a device or connection identifier. Detected transmission request signal 846 is an output of monitoring module 826 and an input to request identification module 832. Identification information corresponding to a detected request 848 is an output of request identification module 832 and an input to user matching module 834.

User matching module 834 identifies whether or not a device or connection identifier associated with a transmission request for the current traffic interval matches a device or connection identifier in stored information 842. The stored information corresponding to previous traffic intervals which is used by user matching module 834 has been retrieved by retrieval module 828. User matching module 834 determines if there is a stored wireless terminal identifier or connection identifier in stored information 842 which matches an identifier corresponding to a detected transmission request for the current traffic interval. Thus user matching module 834 checks a stored list, e.g., a list of "blacklisted" wireless terminals or "blacklisted" connections whose transmission request signaling is known to have corresponded to determined low traffic data rates for device 800 in one or more prior traffic intervals, to see if there is a match with a detected transmission request for the current traffic interval. Result of matching check 850 is an output of user matching module 834, e.g., an indication as to whether or not a match has been found on a list of "blacklisted" devices or connections.

Transmission rate determination module 836 determines a transmission rate to be used by device 800 for the current traffic interval. Information 854 is an output of transmission rate determination module 836.

Rate comparison module 838 compares a determined data rate, e.g., information 854, for communications device 800 for a current traffic interval to a threshold, e.g., a threshold stored in rate threshold information 844.

Updating module 840 adds a device or connection identifier to a list, e.g., list 860 or list 862, when the rate comparison module 838 determines that the data rate for communications device 800 for the current traffic interval is below a threshold. Update decision information 858 includes information identifying whether or not an update should be performed, and information to be stored as part of an update, e.g., a device or connection identifier to be added to a list of "blacklisted" devices or connections, when the decision is to perform an update.

Figure 9:
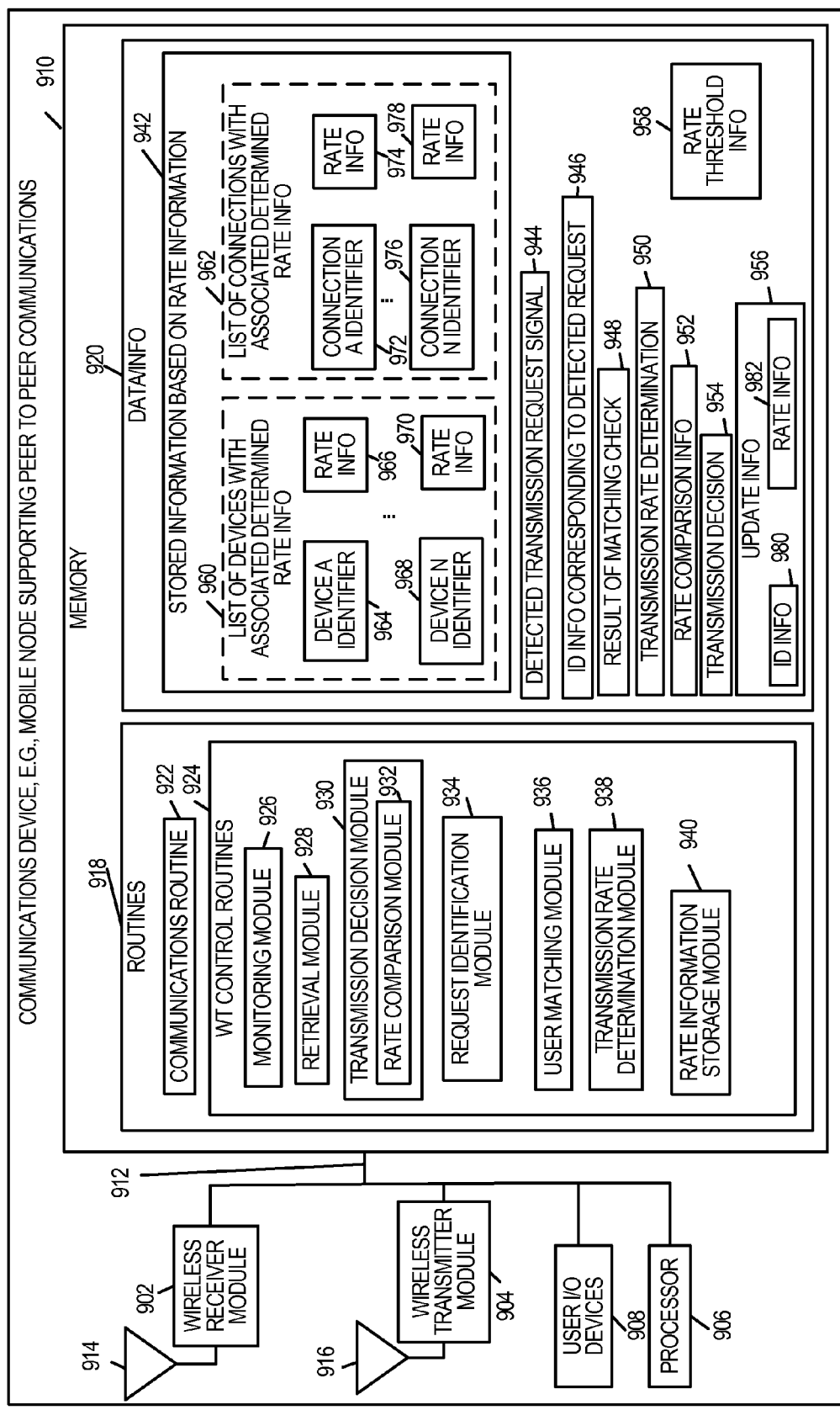
FIG. 9 is a drawing of an exemplary communications device, e.g., a mobile node supporting peer to peer communications in accordance with various embodiments.

FIG. 9 is a drawing of an exemplary communications device 900, e.g., mobile node supporting peer to peer communications in accordance with various embodiments. Exemplary communications device 900 includes a wireless receiver module 902, a wireless transmitter module 904, a processor 906, user I/O devices 908, and memory 910 coupled together via a bus 912 over which the various elements exchange data and information.

Wireless receiver module 902, e.g., an OFDM receiver, is coupled to receive antenna 914 via which the communications device 900 receives signals from other communications devices. For example, communications device 900 receives transmission request response signals, rate information signals, and traffic channel acknowledgment signals from another peer to peer communications device with which the communications device 900 has a connection. Wireless receiver module 902 also receives transmission request signals from other peer to peer communications device with which communications device 900 does not have a current connection.

Wireless transmitter module 904, e.g., an OFDM transmitter, is coupled to transmit antenna 916 via which the communications device 900 transmits signals. Transmitted signals include transmission request signals, peer to peer pilot signals, and traffic signals to a peer to peer device with which communications device 900 has a connection. In some embodiments, the same antenna is used for both transmitter and receiver.

User I/O devices 908 include, e.g., a microphone, a keyboard, a keypad, mouse, camera, switches, speaker, display, etc. User I/O devices 908 allow a user of communications device 900 to input data/information, access output data/information, and control at least some functions of the communications device 900.

Memory 910 includes routines 918 and data/information 920. The processor 906, e.g., a CPU, executes the routines 918 and uses the data/information 920 in memory 910 to control the operation of the communications device 900 and implement methods, e.g., the method of flowchart 600 of FIG. 6 or the method of flowchart 700 of FIG. 7.

Routines 918 include a communications routine 922 and wireless terminal control routines 924. The communications routine 922 implements the various communications protocols used by the communications device 900. The wireless terminal control routines 924 include a monitoring module 926, a retrieval module 928, a transmission decision module 930, a request identification module 934, a user matching module 936, a transmission rate determination module 938, a rate information storage module 940. The transmission decision module 930 includes a rate comparison module 932.

Data/information 920 includes stored information based on rate information 942, a detected transmission request signal 944, identification information corresponding to a detected request 946, a result of a matching check 948, a transmission rate determination 950, rate comparison information 952, a transmission decision 954, update information 956, and rate threshold information 958. The update information 956 includes identification information 980 and rate information 982.

In one exemplary embodiment, stored information based on rate information 942 includes a list of wireless devices with associated determined rate information 960, while in another exemplary embodiment information 942 includes a list of connections with associated determined rate information 962. List of devices with associated determined rate information 960 includes a plurality of sets of: (i) a device identifier and (ii) rate information corresponding to a determined rate for device 900 for a traffic interval in which the device identified by the device identifier issued a request to transmit traffic in the traffic interval to a peer to peer device other than device 900 (device A identifier 964 with corresponding rate information 966 . . . , device N identifier 968 with corresponding rate information 970). List of connections with associated determined rate information 962 includes a plurality of sets of: (i) a connection identifier and (ii) rate information corresponding to a determined rate for device 900 for a traffic interval in which the connection identified by the connection identifier communicated a request to transmit traffic in the traffic interval to a peer to peer device other than device 900 (connection A identifier 972 with corresponding rate information 974 . . . , connection N identifier 976 with corresponding rate information 978).

Monitoring module 926 monitors to detect transmission requests corresponding to a traffic interval, e.g., a transmission request from a peer to peer device requesting another peer to peer device with which it has a connection to transmit traffic signals into a corresponding traffic interval. Monitoring module 926 monitors to detect transmission requests intended for communications device 900 from another communications device with which communications device has a peer to peer connection. Monitoring module 926 also monitors to detect transmission requests, which are requests directed to other communications devices, e.g., a request communicated between a pair of connected communications devices which does not include communications device 900.

Retrieval module 928 accesses stored information based on rate information indicating a device or connection for which a transmission request corresponding to a previous traffic interval was detected. For example, consider an exemplary embodiment in which device 900 stores and maintains a list of device identifiers with associated determined rate information 960, the retrieval module 928, retrieves rate information 966 in response to user matching module 936 finding that identification information corresponding to a detected request 946 matches device A identifier 964. Alternatively, consider an exemplary embodiment in which device 900 stores and maintains a list of connection identifiers with associated determined rate information 962, the retrieval module 928, retrieves rate information 978 in response to user matching module 936 finding that identification information corresponding to a detected request 946 matches connection N identifier 976.

Transmission decision module 930 decides whether or not device 900 should transmit during a current traffic interval based on stored information for one or more previous intervals. Rate comparison module 932 compares a determined rate of a previous traffic interval for device 900 to a transmission rate threshold, the previous traffic interval being a traffic interval for which a transmission request intended for a device with which device 900 does not have a connection was detected by device 900.

Request identification module 934 associates a detected transmission request with a device or connection identifier. Detected transmission request signal 944 is an output of monitoring module 926 and an input to request identification module 934. Identification information corresponding to a detected request 946 is an output of request identification module 934 and an input to user matching module 936.

User matching module 936 identifies whether or not a device or connection identifier associated with the current traffic interval matches a device or connection identifier in stored information 942. Thus user matching module 936 determines if there is stored rate information for device 900 corresponding to a previous traffic interval in which the same request that was identified for the current interval identified by information 946 had been detected.

Transmission rate determination module 938 determines a transmission rate to be used by device 900 for the current traffic interval. Information 950 is an output of transmission rate determination module 938. Rate information storage module 940 stores a determined transmission rate and a device or connection identifier corresponding to a device or connection corresponding to a detected transmission request corresponding to the current traffic interval. For example, rate information storage module 940 forms update information 956 including identification information 980 and rate information 982, which it stores in stored information based on rate information 942. For example, ID information 980 of the update is information 946 and rate information 982 of the update is transmission rate determination information 950. After updating one of the list of devices with associated determined rate 960 and list of connections with associated determined rate information, the updated list will be available for access and use in a subsequent traffic interval. The communications device 900 can, and sometimes does, base current traffic interval transmission decisions upon prior data performance information, e.g., rate information, and/or prior identified concurrent user information, corresponding to prior traffic intervals.

Figure 10:
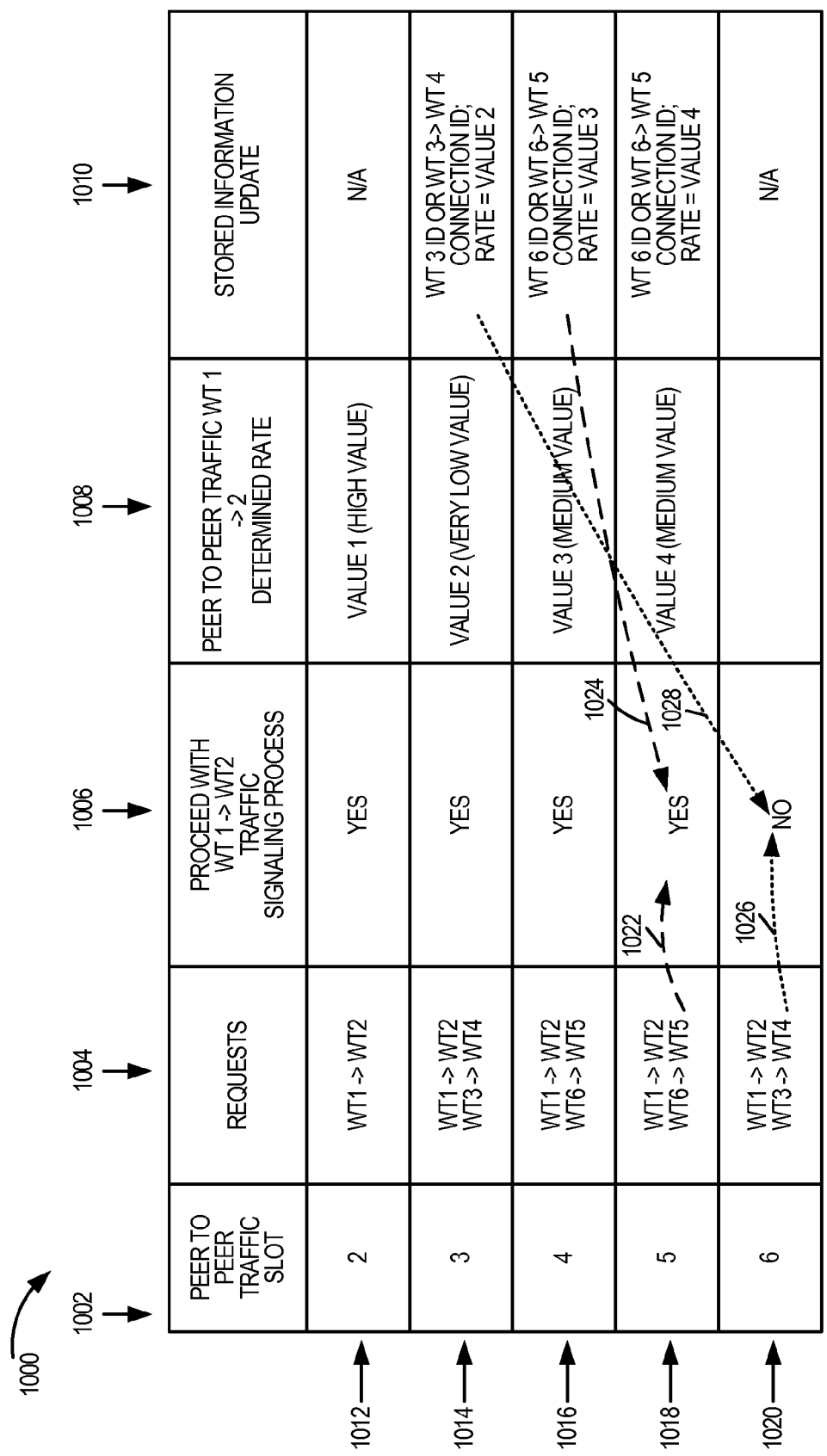
FIG. 10 is an exemplary table used to explain an example illustrating features of an exemplary embodiment in which a device makes a decision about proceeding with a traffic signaling process for a current traffic interval as a function of stored information corresponding to a previous traffic interval.

FIG. 10 is an exemplary table 1000 used to explain an example illustrating features of an exemplary embodiment in which a device, e.g., WT 1 which has an ongoing wireless peer to peer connection with WT 2, makes a decision about proceeding with a traffic signaling process for a current traffic interval as a function of stored information corresponding to a previous traffic interval. In the example, of FIG. 10 the stored information includes (i) one of a wireless terminal identifier and a connection identifier which identify a source of interference and (ii) information indicating a determined rate in the presence of the identified source of interference.

First column 1002 identifies the peer to peer traffic slot, which in this example ranges from index number 2 to index number 6. Second column 1004 indicates the requests transmitted for the slot. Third column 1006 indicates the decision by WT 1 as to whether or not it should proceed with the traffic signaling process for the current traffic slot as a function of received requests corresponding to other connections and stored information corresponding to previous slots. Fourth column 1008 indicates a determined peer to peer traffic rate for WT 1 corresponding to the current slot. Fifth column 1010 indicates stored information update information which is performed.

Row 1012 identifies that in exemplary peer to peer traffic slot 2 WT 1 sends a transmission request to WT 2; WT 1 decides to proceed with the traffic signaling process for the current slot; and WT 1 determines a data rate for peer to peer traffic signaling for the traffic interval of the traffic slot for traffic signals from WT 1 to WT 2 to be equal to value 1, which is a high value.

Row 1014 identifies that in exemplary peer to peer traffic slot 3 WT 1 sends a transmission request to WT 2 and WT 3 sends a transmission request to WT 4 which is detected by WT 1; WT 1 decides to proceed with the traffic signaling process for the current slot; and WT 1 determines a data rate for peer to peer traffic signaling for the traffic interval of the traffic slot for traffic signals from WT 1 to WT 2 to be equal to value 2, which is a very low value. WT 1 stores, e.g., in a table, information identifying: (i) a WT 3 identifier or a WT 3 to WT 4 connection identifier and (ii) information indicating that the peer to peer data rate for WT 1 to WT 2 traffic signaling was value 2.

Row 1016 identifies that in exemplary peer to peer traffic slot 4 WT 1 sends a transmission request to WT 2 and WT 6 sends a transmission request to WT 5 which is detected by WT 1; WT 1 decides to proceed with the traffic signaling process for the current slot; and WT 1 determines a data rate for peer to peer traffic signaling for the traffic interval of the traffic slot for traffic signals from WT 1 to WT 2 to be equal to value 3, which is a medium value. WT 1 stores, e.g., in a table, information identifying: (i) a WT 6 identifier or a WT 6 to WT 5 connection identifier and (ii) information indicating that the peer to peer data rate for WT 1 to WT 2 traffic signaling was value 3.

Row 1018 identifies that in exemplary peer to peer traffic slot 5 WT 1 sends a transmission request to WT 2 and WT 6 sends a transmission request to WT 5 which is detected by WT 1; WT 1 decides to proceed with the traffic signaling process for the current slot. It should be observed that the decision to proceed, made by WT 1, used as input information identifying that a request was received from WT 6 as indicated by arrow 1022 and stored information associating a previous slot detected request from WT 6 with a previous determined rate for WT 1, as indicated by arrow 1024. In this example, the stored rate was value 3, which was a medium value, e.g., it exceeded a transmission threshold level; therefore WT 1 decided to proceed with the traffic signaling process.

WT 1 determines a data rate for peer to peer traffic signaling for the traffic interval of the traffic slot for traffic signals from WT 1 to WT 2 to be equal to value 4, which is a medium value. WT 1 stores, e.g., in a table, information identifying: (i) a WT 6 identifier or a WT 6 to WT 5 connection identifier and (ii) information indicating that the peer to peer data rate for WT 1 to WT 2 traffic signaling was value 4.

Row 1020 identifies that in exemplary peer to peer traffic slot 6 WT 1 sends a transmission request to WT 2 and WT 3 sends a transmission request to WT 4 which is detected by WT 1; WT 1 decides not to proceed with the traffic signaling process for the current slot. It should be observed that the decision not to proceed, made by WT 1, used as input information identifying that a request was received from WT 3 as indicated by arrow 1026 and stored information associating a previous slot detected request from WT 3 with a previous determined rate for WT 1, as indicated by arrow 1028. In this example, the stored rate was value 2, which was a very low value, e.g., it was below a transmission threshold level; therefore WT 1 decided not to proceed with the traffic signaling process.

Figure 11:
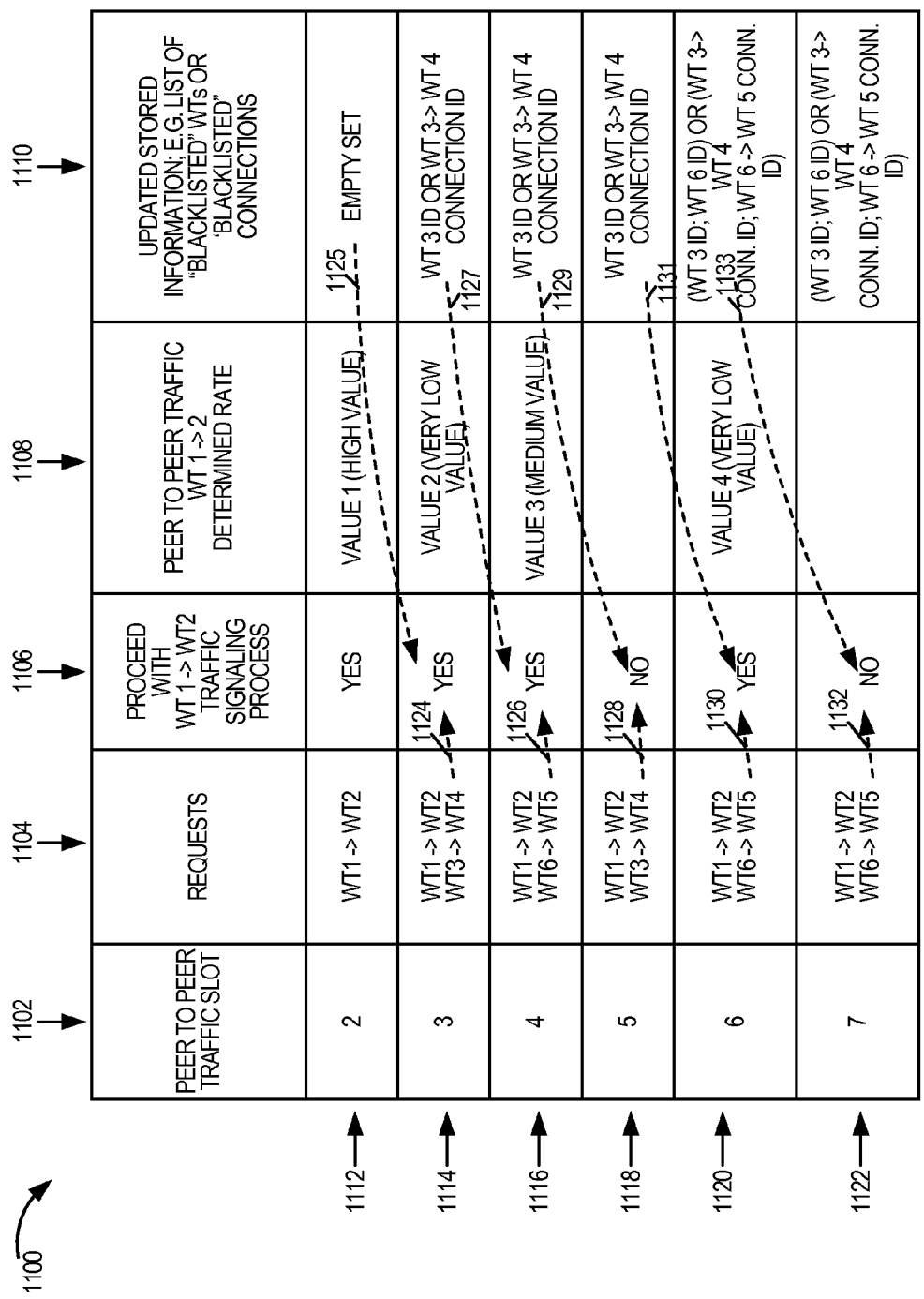
FIG. 11 is an exemplary table used to explain an example illustrating features of an exemplary embodiment in which a device makes a decision about proceeding with a traffic signaling process for a current traffic interval as a function of stored information corresponding to a previous traffic interval.

FIG. 11 is an exemplary table 1100 used to explain an example illustrating features of an exemplary embodiment in which a device, e.g., WT 1 which has an ongoing wireless peer to peer connection with WT 2, makes a decision about proceeding with a traffic signaling process for a current traffic interval as a function of stored information corresponding to a previous traffic interval. In the example, of FIG. 11 the stored information includes a list of wireless terminals or a list of connections which are considered "blacklisted" from the perspective of WT 1.

First column 1102 identifies the peer to peer traffic slot, which in this example ranges from index number 2 to index number 7. Second column 1104 indicates the requests transmitted for the slot. Third column 1106 indicates the decision by WT 1 as to whether or not it should proceed with the traffic signaling process for the current traffic slot as a function of received requests corresponding to other connections and stored information corresponding to previous slots. Fourth column 1108 indicates a determined peer to peer traffic rate for WT 1 corresponding to the current slot. Fifth column 1110 indicates updated stored information, e.g., an updated list of "blacklisted" wireless terminals or an updated list of "blacklisted" connections.

Row 1112 identifies that in exemplary peer to peer traffic slot 2 WT 1 sends a transmission request to WT 2; WT 1 decides to proceed with the traffic signaling process for the current slot; and WT 1 determines a data rate for peer to peer traffic signaling for the traffic interval of the traffic slot for traffic signals from WT 1 to WT 2 to be equal to value 1, which is a high value. At this time no wireless terminals or connections are considered "blacklisted".

Row 1114 identifies that in exemplary peer to peer traffic slot 3 WT 1 sends a transmission request to WT 2 and WT 3 sends a transmission request to WT 4 which is detected by WT 1. WT 1 checks the stored list of blacklisted wireless terminals or connections (1125) against the received request from WT 3 (1124) and recognizes that there is no match; therefore WT 1 decides that it is ok to proceed with the traffic signaling process for the current slot. WT 1 determines a data rate for peer to peer traffic signaling for the traffic interval of the traffic slot for traffic signals from WT 1 to WT 2 to be equal to value 2, which is a very low value. Since value 2 is below a threshold, WT 1 stores, e.g., in a table of undesirables, information identifying: a WT 3 identifier or a WT 3 to WT 4 connection identifier.

Row 1116 identifies that in exemplary peer to peer traffic slot 4 WT 1 sends a transmission request to WT 2 and WT 6 sends a transmission request to WT 5 which is detected by WT 1. WT 1 checks the stored list of blacklisted wireless terminals or connections (1127) against the received request from WT 6 (1126) and recognizes that there is no match; therefore WT 1 decides that it is ok to proceed with the traffic signaling process for the current slot. WT 1 determines a data rate for peer to peer traffic signaling for the traffic interval of the traffic slot for traffic signals from WT 1 to WT 2 to be equal to value 3, which is a medium. Since value 3 is above a threshold, WT 1 does not add new information to the blacklisted table.

Row 1118 identifies that in exemplary peer to peer traffic slot 5 WT 1 sends a transmission request to WT 2 and WT 3 sends a transmission request to WT 4 which is detected by WT 1. WT 1 checks the stored list of blacklisted wireless terminals or connections (1129) against the received request from WT 3 (1128) and recognizes that there is a match; therefore WT 1 decides not to proceed with the traffic signaling process for the current slot.

Row 1120 identifies that in exemplary peer to peer traffic slot 6 WT 1 sends a transmission request to WT 2 and WT 6 sends a transmission request to WT 5 which is detected by WT 1. WT 1 checks the stored list of blacklisted wireless terminals or connections (1131) against the received request from WT 6 (1130) and recognizes that there is no match; therefore WT 1 decides that it is ok to proceed with the traffic signaling process for the current slot. WT 1 determines a data rate for peer to peer traffic signaling for the traffic interval of the traffic slot for traffic signals from WT 1 to WT 2 to be equal to value 4, which is a very low value. Since value 4 is below a threshold, WT 1 adds the WT 6 identifier or the WT 6 to WT 5 connection identifier to the stored list.

Row 1122 identifies that in exemplary peer to peer traffic slot 7 WT 1 sends a transmission request to WT 2 and WT 6 sends a transmission request to WT 5 which is detected by WT 1. WT 1 checks the stored list of blacklisted wireless terminals or connections (1133) against the received request from WT 6 (1132) and recognizes that there is a match; therefore WT 1 decides not to proceed with the traffic signaling process for the current slot.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, monitoring to detect transmission requests corresponding to a current traffic interval, accessing stored information based on rate information, deciding whether or not to transmit during the current traffic interval based on the stored information for one or more previous traffic intervals, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A communication method, the method comprising:
    monitoring in a communication device to detect transmission requests sent by one or more other communication devices or connections during a current traffic interval in a peer-to-peer recurring timing structure of equal time intervals;

accessing stored information based on rate information of the communication device obtained during a previous traffic interval in the recurring timing structure, said stored information including information indicating detected transmission requests from devices or connections of the one or more other communication devices or connections during the previous traffic interval;

deciding whether or not to transmit with the communication device during the current traffic interval based on said stored information for the previous traffic interval; and determining a transmission rate to be used by the communication device during the current traffic interval when the decision is made to transmit with the communication device during the current interval.

2. The communication method of claim 1,
wherein deciding whether or not to transmit during the current traffic interval is also based on detection of a transmission request from a device or connection of the one or more other communication devices or during the current traffic interval.

3. The communication method of claim 2, wherein deciding whether or not to transmit during the current traffic interval includes:
deciding not to transmit when a transmission request is detected from the at least one device or connection included in the stored information.

4. The communication method of claim 1, wherein said stored information includes a list of devices or connections from the one or more other communication devices or connections sending transmission requests during one or more previous traffic intervals in which a data rate of the communication device was below a threshold.

5. The communication method of claim 1, further comprising:
comparing the determined transmission rate to a threshold; and
if said determined transmission rate is below said threshold updating the stored information to include a device or connection identifier corresponding to a device or connection of the one or more other communication devices or connections detected issuing a transmission request during the current traffic interval.

6. The communication method of claim 1, wherein said stored information includes:
rate information of the communication device corresponding to a previous traffic interval, and information identifying a device or connection corresponding to at least one device or connection of the one or more other communication devices issuing a transmission request during said previous traffic interval.

7. The communication method of claim 1, wherein deciding whether or not to transmit includes:
comparing a rate of the communication device for a previous traffic interval during which a transmission request from a first device of the one or more other communication devices or connections was detected to a transmission rate threshold, said first device being a device from which a transmission request was detected during the current traffic interval.

8. The communication method of claim 7, further comprising:
determining a transmission rate to be used by the communication device during the current traffic interval; and
storing said determined transmission rate and a device or connection identifier corresponding to a device or connection of the one or more other communication devices or connections detected issuing a transmission request during the current traffic interval.

9. A communication comprising:
a monitoring module for detecting transmission requests sent by one or more other communication devices or connections during a current traffic in a peer-to-peer recurring timing structure of equal time intervals;
a memory for storing information based on rate information of the communication device corresponding to a traffic interval;
a retrieval module for accessing stored information based on rate information of the communication device obtained during a previous traffic interval in the recurring timing structure, said stored information including information indicating detected transmission requests from devices or connections of the one or more other communication devices or connections during the previous traffic interval;
a transmission decision module for deciding whether or not to transmit with said communication device during the current traffic interval based on said stored information for the previous interval; and
a transmission rate determination module for determining a transmission rate to be used by said communication device for transmission during the current traffic interval.

10. The communication device of claim 9, further comprising:
a request identification module for associating a detected transmission request with a device or connection identifier;
user matching module for identifying whether or not the device or connection identifier associated with the detected transmission request matches a device or connection identifier corresponding to at least one of the one or more other communication devices or connections in said stored information; and
wherein said transmission decision module decides whether or not to transmit with said communication device during the current traffic interval based on a device or connection identifier corresponding to a detected transmission request during to the current traffic interval.

11. The communication device of claim 10, wherein said transmission decision module decides not to transmit during the current traffic interval when said user matching module determines that there is a match.

12. The communication device of claim 9, wherein said stored information includes a list of devices or connections with which a data rate below a threshold was determined for one or more previous traffic intervals, the communications device further comprising:
a rate comparison module for comparing a determined data rate for the communications device for a current traffic interval to a threshold; and
an updating module for adding a device or connection identifier corresponding to at least one of the one or more other communication devices or connections to said list when said rate comparison module determines that the data rate for the communication device for the current traffic interval is below the threshold.

13. The communication device of claim 9, wherein said stored information includes rate information of said communication device corresponding to a previous traffic interval, and information identifying a device or connection corresponding to at least one other device or connection of the one or more other communication devices issuing a transmission request during said previous traffic interval.

14. The communication device of claim 9, wherein said transmission decision module includes:
   a rate comparison module for comparing a rate of said communication device for a previous traffic interval during which a transmission request from a first device of the one or more other communication devices or connections was detected to a transmission rate threshold, said first device being a device from which a transmission request during the current traffic interval was detected.

15. The communication device of claim 14, further comprising:
   a rate determination module for determining a transmission rate to be used by said communication device for transmission during the current traffic interval; and
   a rate information storage module for storing said determined transmission rate and a device or connection identifier corresponding to a device or connection of the one or more other communication devices or connections detected issuing a transmission request during the current traffic interval.

16. A communications device comprising:
   monitoring means for monitoring in said communications device to detect transmission requests sent by one or more other communication devices or connections during a current traffic interval in a peer-to-peer recurring timing structure of equal time intervals;
   memory means for storing information based on rate information of said communications device during a traffic interval;
   retrieval means for accessing stored information based on rate information of the communications device obtained during a previous traffic interval in the recurring timing structure, said stored information including information indicating detected transmission requests from devices or connections of the one or more other communication devices or connections during the previous traffic interval;
   transmission decision means for deciding whether or not to transmit with said communications device during the current traffic interval based on said stored information for the previous interval; and
   transmission rate determination means for determining a transmission rate to be used by said communication device for transmission during the current traffic interval.

17. The communications device of claim 16, further comprising:
   request identification means for associating a detected transmission request with a device or connection identifier;
   user matching means for identifying whether or not the device or connection identifier associated with the detected transmission request matches a device or connection identifier in said stored information; and
   wherein said transmission decision means decides whether or not to transmit during the current traffic interval based on a device or connection identifier corresponding to a detected transmission request corresponding to the current traffic interval.

18. The communications device of claim 17, wherein said transmission decision means decides not to transmit during the current traffic interval when said user matching means determines that there is a match.

19. The communications device of claim 16, wherein said stored information includes rate information of said communications device corresponding to a previous traffic interval, and information identifying a device or connection of the one or more other communication devices or connections corresponding to a detected transmission request during said previous traffic interval.

20. A non-transitory computer readable medium embodying machine executable instructions for controlling a communication device to implement a communications method, the method comprising:
   monitoring in the communication device to detect transmission requests sent by one or more other communication devices or connections during a current traffic in a peer-to-peer recurring timing structure of equal time intervals;
   accessing stored information based on rate information of the communication device obtained during a previous traffic interval in the recurring timing structure, said stored information including information indicating detected transmission requests from devices or connections of the one or more other communication devices or connections during the previous traffic interval;
   deciding whether or not to transmit with the communication device during the current traffic interval based on said stored information for the previous traffic interval; and
   determining a transmission rate to be used by the communication device during the current traffic interval when the decision is made to transmit with the communication device during the current interval.

21. The computer readable medium of claim 20, wherein deciding whether or not to transmit during the current traffic interval is also based on detection of a transmission request from a device or connection of the one or more other communication devices or connections during the current traffic interval.

22. The computer readable medium of claim 21, wherein deciding whether or not to transmit during the current traffic interval includes:
   deciding not to transmit when a transmission request is detected from the at least one device or connection included in the stored information.

23. An apparatus comprising:
   a processor configured to implement a communications method, the method comprising:
      monitoring in the communication device to detect transmission requests sent by one or more other communication devices or connections during a current traffic interval in a peer-to-peer recurring timing structure of equal time intervals;
      accessing stored information based on rate information of the communication device obtained during a previous traffic interval in the recurring timing structure, said stored information including information indicating detected transmission requests from devices or connections of the one or more other communication devices or connections during the previous traffic interval;

deciding whether or not to transmit with the communication device during the current traffic interval based on said stored information for the previous traffic interval; and determining a transmission rate to be used by the communication device during the current traffic interval when the decision is made to transmit with the communication device during the current interval.

24. The apparatus of claim 23,
wherein deciding whether or not to transmit during the current traffic interval is also based on detection of a transmission request from a device or connection of the one or more other communication devices or connections during the current traffic interval.

25. The apparatus of claim 24, wherein deciding whether or not to transmit during the current traffic interval includes:
deciding not to transmit when a transmission request is detected from the at least one device or connection included in the stored information.

* * * * *